United States Patent
Brady et al.

(10) Patent No.: US 7,351,975 B2
(45) Date of Patent: Apr. 1, 2008

(54) SENSOR SYSTEM FOR IDENTIFYING AND TRACKING MOVEMENTS OF MULTIPLE SOURCES

(75) Inventors: David J. Brady, Durham, NC (US);
Bobby D. Guenther, Cary, NC (US);
Steve Feller, Durham, NC (US);
Mohan Shankar, Durham, NC (US);
Jian-Shuen Fang, Durham, NC (US);
Qi Hao, Chapel Hill, NC (US)

(73) Assignee: Duke University, Durham, NC (US)

( * ) Notice: Subject to any disclaimer, the term of this patent is extended or adjusted under 35 U.S.C. 154(b) by 106 days.

(21) Appl. No.: 11/391,223

(22) Filed: Mar. 29, 2006

(65) Prior Publication Data
US 2007/0023662 A1    Feb. 1, 2007

Related U.S. Application Data

(60) Provisional application No. 60/665,837, filed on Mar. 29, 2005.

(51) Int. Cl.
*G01J 5/02* (2006.01)
(52) U.S. Cl. ............... 250/342; 250/338.3; 250/DIG. 1
(58) Field of Classification Search .......... 250/DIG. 1, 250/342, 338.3
See application file for complete search history.

(56) References Cited

U.S. PATENT DOCUMENTS 5,369,269 A * 11/1994 Fukuda et al. .............. 250/221
5,389,790 A * 2/1995 Honey et al. ............... 250/342
6,081,619 A * 6/2000 Hashimoto et al. ......... 382/181

OTHER PUBLICATIONS

Trivedi, Huang, and Mikic, "Dynamic context capture and distributed video arrays for intelligent spaces," IEEE Trans. Syst. Man, Cybern. A, vol. 35, No. 1, pp. 145-163, Jan. 2005.
Zhao and Nevatia, "Tracking multiple humans in complex situations," IEEE Trans. Pattern Anal. Machine Intell., vol. 26, No. 9, pp. 1208-1221, Sep. 2004.
Comaniciu, Ramesh, and Meer, "Kernel-based object tracking," IEEE Trans. Pattern Anal. Machine Intell., vol. 25, No. 5, pp. 564-577, May 2003.

(Continued)

*Primary Examiner*—Constantine Hannaher
(74) *Attorney, Agent, or Firm*—Kasha Law PLLC; John R. Kasha

(57) ABSTRACT

A system identifies a human being from the movement of the human being. The system includes a dual element pyroelectric detector, a Fresnel lens array, and a processor. The dual element pyroelectric detector detects radiation from the human being as the human being moves over time. The Fresnel lens array is located between the dual element pyroelectric detector and the human being. The Fresnel lens array improves collection efficiency and spatial resolution of the dual element pyroelectric detector. The Fresnel lens array includes a mask. The mask provides at least one zone of visibility. The processor is coupled to the dual element pyroelectric detector, the processor converts the detected radiation to a spectral radiation signature. The processor compares the spectral radiation signature to at least a second spectral radiation signature to identify the human being.

25 Claims, 13 Drawing Sheets

OTHER PUBLICATIONS

Ricquebourg and Bouthemy, "Real-time tracking of moving persons by exploiting spatio-temporal image slices," IEEE Trans. Pattern Anal. Machine Intell., vol. 22, No. 8, pp. 797-808, Aug. 2000.

Hu, Tan, Wang, and Maybank, "A survey on visual surveillance of object motion and behaviors," IEEE Trans. Syst., Man, Cybern. C, vol. 34, No. 3, pp. 334-352, Aug. 2004.

Li and Chellappa, "A generic approach to simultaneous tracking and verification in video," IEEE Trans. Image Processing, vol, 11, No. 5, pp. 530-544, May 2002.

Li, Wong, Hu, and Sayeed, "Detection, classification, and tracking of targets," IEEE Signal Processing Mag., vol. 19, No. 2, pp. 17-29, Mar. 2002.

Vermaak, Maskell, and Briers "A Unifying Framework for Multi-Target Tracking and Existence", 8th International Conference on Information Fusion, Jul. 25-28, 2005.).

Stiller and Konrad, "Estimating motion in image sequences," IEEE Signal Processing Mag., vol. 16, No. 4, pp. 70-91, Jul. 1999.

Anderson and Krolik, "Track association for over-the-horizon radar with a statistical ionospheric model," IEEE Trans. Signal Processing, vol. 50, No. 11, pp. 2632-2643, Nov. 2002.

Blackman, "Multiple hypothesis tracking for multiple target tracking," IEEE Aerosp. Electron. Sys. Mag., vol. 19, No. 1, pp. 5-18, Jan. 2004.

Fortmann, Bar-Shalom, and Scheffe, "Sonar tracking of multiple targets using joint probabilistic data association," IEEE J. Oceanic Engineering, vol. 8, No. 3, pp. 173-184, Jul. 1983.

Chang, Chong, and Bar-Shalom, "Joint probabilistic data association in distributed sensor networks," IEEE Trans. Automat. Contr., vol. 31, No. 10, pp. 889-897, Oct. 1986.

Hue, Cadre, and Perez, "Sequential monte carlo methods for multiple target tracking and data fusion," IEEE Trans. Signal Processing, vol. 50, No. 2, pp. 309-325, Feb. 2002.

Vercauteren, Guo, and Wang, "Joint multiple target tracking and classification in collaborative sensor networks," IEEE J. Select. Areas Commun., vol. 23, No. 4, pp. 714-723, Apr. 2005.

Orton and Fitzgerald, "A bayesian approach to tracking multiple targets using sensor arrays and particle filters," IEEE Trans. Signal Processing, vol. 50, No. 2, pp. 216-223, Feb. 2002.

Chong and Kumar, "Sensor networks: evolution, opportunities, and challenges," Proc. IEEE, vol. 91, No. 8, pp. 1247-1256, Aug. 2003.

Chen, Yao, and Hudson, "Source localization and beamforming," IEEE Signal Processing Mag., vol. 19, No. 2, pp. 30-39, Mar. 2002.

Zhao, Shin, and Reich, "Information-driven dynamic sensor collaboration," IEEE Signal Processing Mag., vol. 19, No. 2, pp. 61-72, Mar. 2002.

Lang, "Pyroelectricity: from ancient curiosity to modern imaging tool," Physics Today, vol. 58, No. 8, pp. 31-35, Aug. 2005.

Kang, Samoilov, and Yoon, "Low-frequency response of pyroelectric sensors," IEEE Trans. Ultrason. Ferroelect., Freq. Contr., vol. 45, No. 5, pp. 1255-1260, Sep. 1998.

Hossain and Rashid, "Pyroelectric detectors and their applications," IEEE Trans. Ind. Applicat., vol. 27, No. 5, pp. 824-829, Sep. 1991.

Sixsmith, Johnson, and Whatmore, "Pyroelectric ir sensor array for fall detection in the older population," J. Phys. IV France, vol. 128, pp. 153-160, 2005.

Sekmen, Wilkes, and Kawamura, "An application of passive human-robot interaction: human tracking based on attention distraction," IEEE Trans. Syst., Man, Cybern. A, vol. 32, No. 2, pp. 248-259, Mar. 2002.

Hussain, Baig, Saddawi, and Ahmed, "Infrared pyroelectric sensor for detection of vehicular traffic using digital signal processing techniques," IEEE Trans. Veh. Technol., vol. 44, No. 3, pp. 683-689, Aug. 1995.

Brady, "Multiplex sensors and the constant radiance theorem," Opt. Lett., vol. 27, No. 1, pp. 16-18, Jan. 2002.

Brady, "Reference Structure Tomography," J. Opt. Soc. Am. A, vol. 21, No. 7, pp. 1140-1147, Jul. 2004.

Fang, Hao, Brady, Guenther, Burchett, Shankar, Pitsianis, and Hsu, "Path-dependent human identification using a pyroelectric infrared sensor and fresnel lens arrays," Opt. Exp., vol. 14, No. 2, Jan. 2006.

Gopinathan, Brady, and Pitsianis, "Coded aperture for efficient pyroelectric motion tracking," Opt. Exp., vol. 11, No. 18, pp. 2142-2152, Nov. 2003.

Zheng, Brady, Sullivan, and Guenther, "Fiber-optic localization by geometric space coding with a two-demensional gray code," Appl. Opt., vol. 44, No. 20, pp. 4306-4314, Jul. 2005.

Hao, Fang, Brady, and Guenther, "Real-time walker recognition using pyroelectric sensors," IEEE Trans. Pattern Anal. Machine Intell., submitted for publication.

Frenkel and Feder, "Recursive expectation-maximization algorithms (EM) for time-varying parameters with applications to multiple target tracking," IEEE Trans. Signal Processing, vol. 47, No. 2, pp. 306-320, Feb. 1999.

Molnar and Modestino, "Application of the EM algorithm for the multitarget/multisensor tracking problem," IEEE Trans. Signal Processing, vol. 46, No. 1, pp. 115-129, Jan. 1998.

Rabiner, "A tutorial on hidden markov models and selected applications in speech recognition," Proc. IEEE, vol. 77, No. 2, pp. 257-286, Feb. 1989.

Arulampalam, Maskell, Gordon, and Clapp, "A tutorial on particle filters for online nonlinear/non-gausslan bayesian tracking," IEEE Trans. Signal Processing, vol. 50, No. 2, pp. 174-188, Feb. 2002.

Busboom, Schotten, and Elders-Boll, "Coded aperture imaging with multiple measurements," J. Opt. Soc. Am. A, vol. 14, No. 5, pp. 1058-1065, May 1997.

Hao, "Multiple human tracking and identification with pyroelectric sensors," Ph.D. Dissertation, Duke University, May 2006.

* cited by examiner

700

SENSOR SYSTEM FOR IDENTIFYING AND TRACKING MOVEMENTS OF MULTIPLE SOURCES

CROSS-REFERENCE TO RELATED APPLICATION

This application claims the benefit of U.S. Provisional Patent Application Ser. No. 60/665,837 filed Mar. 29, 2005, which is herein incorporated by reference in its entirety.

This invention was made with Government support under contract no. DAAD 19-03-1-03552 awarded by the Army Research Office. The Government has certain rights in the invention.

BACKGROUND OF THE INVENTION

1. Field of the Invention

Embodiments of the present invention relate to systems and methods for biometric tracking and authentication. More particularly, embodiments of the present invention relate to systems and methods for identifying and authenticating human motion using radiation detectors.

2. Background Information

Biometric systems are widely used in person metrication and secure identification. Some of the biometric systems implemented include fingerprint scanners, iris or retina scanners, pressure pads, face recognition, and voice recognition. All of these implementations use high resolution/high sensitivity devices making them unscalable in terms of bandwidth, computation cost, or both.

In view of the foregoing, it can be appreciated that a substantial need exists for systems and methods that can advantageously provide for scalable and low cost biometric tracking and authentication.

BRIEF SUMMARY OF THE INVENTION

One embodiment of the present invention is a system for identifying an object from movement of the object. The system includes a sensor and a processor. The sensor detects radiation from the object as the object moves over time. The processor is coupled to the sensor. The processor converts the detected radiation to a spectral radiation signature. The processor compares the spectral radiation signature to at least a second spectral radiation signature to identify the object.

Another embodiment of the present invention is a system for identifying an object from movement of the object. The system includes a sensor and a processor. The sensor detects radiation from the object as the object moves along a first path over time. The processor is coupled to the sensor. The processor converts the detected radiation to a spectral radiation signature. The processor obtains temporal radiation data from a second object moving along a second path using the sensor. The processor converts the temporal radiation data from the second object to a second spectral radiation signature. The processor applies principal components analysis to the second spectral radiation signature to produce underlying factors and scores for the second spectral radiation signature. The processor applies a multiple linear regression to the underlying factors and scores to produce a regression vector and a mean and covariance of clustered data for the second spectral radiation signature. The processor obtains an inner product of the regression vector and the spectral radiation signature. The processor compares the inner product to the mean and covariance of clustered data to determine if the identity of the object matches the second object.

Another embodiment of the present invention is a method for identifying an object from movement of the object. First temporal radiation data is obtained from a first object moving along a first path using the sensor. The first temporal radiation data from the first object is converted to a first spectral radiation signature. Principal components analysis is applied to the first spectral radiation signature to produce underlying factors and scores for the first spectral radiation signature. Multiple linear regression is applied to the underlying factors and scores to produce a regression vector and a mean and covariance of clustered data for the first spectral radiation signature. Second temporal radiation data is obtained from a second object moving along a second path using the sensor. The second temporal radiation data from the second object is converted to a second spectral radiation signature. An inner product of the regression vector and the second spectral radiation signature is calculated. The inner product is compared to the mean and covariance of clustered data to determine if the identity and location of the first object match the second object.

Another embodiment of the present invention is a system for identifying a human being from movement of the human being. The system includes a dual element pyroelectric detector, a Fresnel lens array, and a processor. The dual element pyroelectric detector detects radiation from the human being as the human being moves over time. The Fresnel lens array is located between the dual element pyroelectric detector and the human being. The Fresnel lens array improves collection efficiency and spatial resolution of the dual element pyroelectric detector. The Fresnel lens array includes a mask. The mask provides at least one zone of visibility. The processor is coupled to the dual element pyroelectric detector, the processor converts the detected radiation to a spectral radiation signature. The processor compares the spectral radiation signature to at least a second spectral radiation signature to identify the human being.

Another embodiment of the present invention is a system for identifying a human being from movement of the human being. The system includes a dual element pyroelectric detector, a Fresnel lens array, and a processor. The dual element pyroelectric detector detects radiation from the human being as the human being moves along a first path over time. The Fresnel lens array is located between the dual element pyroelectric detector and the human being. The Fresnel lens array improves collection efficiency and spatial resolution of the dual element pyroelectric detector. The Fresnel lens array includes a mask. The mask provides at least one zone of visibility. The processor is coupled to the dual element pyroelectric detector, the processor converts the detected radiation to a spectral radiation signature. The processor obtains temporal radiation data from a second human being moving along a second path using the sensor. The processor converts the temporal radiation data from the second human being to a second spectral radiation signature. The processor applies principal components analysis to the second spectral radiation signature to produce underlying factors and scores for the second spectral radiation signature. The processor applies a multiple linear regression to the underlying factors and scores to produce a regression vector and a mean and covariance of clustered data for the second spectral radiation signature. The processor obtains an inner product of the regression vector and the spectral radiation signature. The processor compares the inner product to the mean and covariance of clustered data to determine if the identity of the human being matches the second human being.

Figure 1:
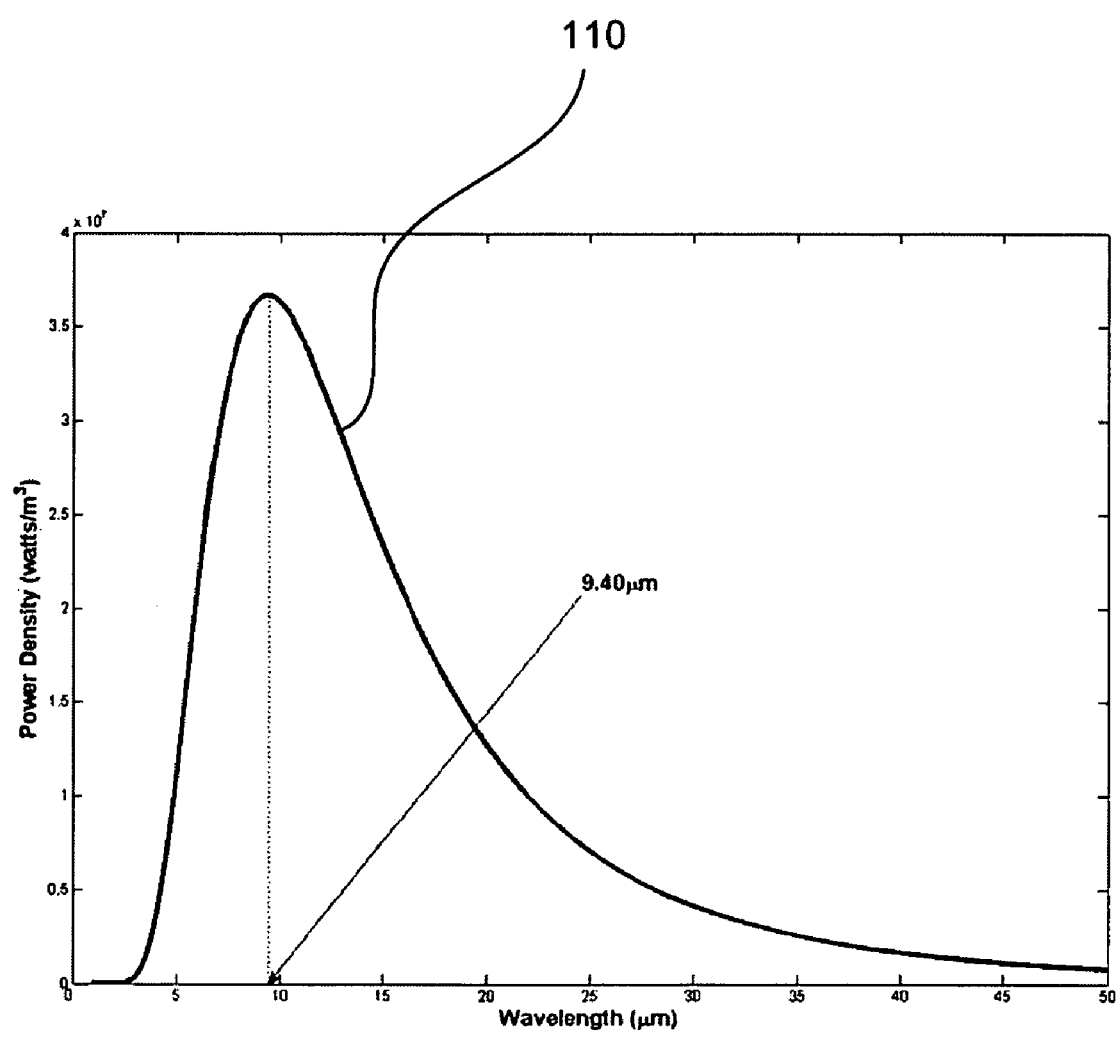
FIG. 1 is an exemplary plot of a black-body radiation curve of a human body at 37 degrees Celsius, in accordance with an embodiment of the present invention.
Figure 1:
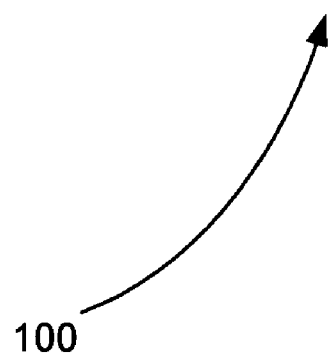

Embodiments of the invention are described in detail below. One skilled in the art, however, will appreciate that the invention is not limited in its application to the details of construction, the arrangements of components, and the specific steps set forth in the detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The present invention is based upon the radiation characteristics of an object, such as a person, animal, or vehicle. The temperature of a typical human body is about 37 degrees C. or 98 degrees F. There is a constant heat exchange between the body and the environment due to the difference in their temperatures. The radiation characteristics of any object can be analyzed using the black-body radiation curve governed by Planck's Law.

FIG. 1 is an exemplary plot 100 of a black-body radiation curve 110 of a human body at 37 degrees Celsius, in accordance with an embodiment of the present invention. In FIG. 1, it can be seen that essentially all of the radiation is in the infrared region, with the peak radiation occurring at 9.55 μm. To estimate human body radiation of heat to its environment, Planck's Law is integrated over the transmission window of a sensor. The average human body radiates about 100 $W/m^2$ of power. Thus, infrared detectors that are sensitive in a range of 8~14 μm are able to detect humans within a reasonable distance.

A pyroelectric infrared (PIR) sensor has high performance for infrared (IR) radiation detection at room temperature. Recently, PIR sensors have been used for a wide range of applications such as intruder detection, light actuators, and auxiliary sensing to complement the coverage of cameras. PIR sensors are attractive for security applications due to their low cost and low power consumption. Equally attractive, PIR sensors do not need special or expensive cooling.

According to another embodiment of the present invention, a wireless distributed pyroelectric sensor system is used for human target tracking. One aspect of human tracking is human identification or recognition. Human identification not only plays an important role in security systems and scene surveillance, but also is a necessity for tracking multiple humans, by reducing the mutual interference among those human objects during the tracking process.

According to another embodiment of the present invention, a pyroelectric sensor system for human recognition serves as a component of a biometric system, a requirement for many intelligent machine systems and secure systems. In conventional biometric systems, the complex structure of certain body parts, such as a human iris, human fingerprints, facial, or hand geometry, are measured optically, analyzed digitally, and a digital code is created for each person. When humans walk, the motion of various components of the body, including the torso, arms, and legs, produce a characteristic signature.

According to another embodiment of the present invention, a pyroelectric sensor system detects the motion of various components of the body, including the torso, arms, and legs, and produces a characteristic signature that it is sufficiently discriminatory to allow verification in some low-security applications. Much of the work on gait analysis as a behavior biometric has been conducted using video cameras which stream and process large amounts of data to extract the identity of the person under examination in a computationally expensive way. A continuous-wave (CW) radar, for example, has been developed to record the radar signature corresponding to the walking human gait.

From a thermal perspective, each person acts as a distributed infrared source whose distribution function is determined by their shape and the IR emission of their extremity. Combined with the idiosyncrasies in how they carry themselves, the heat impacts a surrounding sensor field in a unique way. By measuring the sensor response to a person in a prescribed walking path, this response data is mapped to a code vector in a two-dimensional (2-D) plane that uniquely identifies the person at a specific speed level.

A functional biometric system requires the specific human characteristics in use to be universal, distinctive, permanent, and collectable. Universal means each person should have his/her own characteristic. Distinctive means any two persons should have separable characteristics. Permanent means the characteristic should be sufficiently invariant, under a certain matching criterion, over a period of time.

Collectable means the characteristic must be a measurable quantity. A biometric system is an intrinsic pattern recognition system and comprises three parts: feature representation, feature training (clustering), and feature testing.

According to another embodiment of the present invention, data collected from a sensor (e.g., a pyroelectric sensor) is analyzed using spectral techniques to extract the motion features of individuals. The experimental results display the spectral distinctions among different humans walking at different speeds. The spectral features of objects at a specific speed are collected repeatedly with small variances, given a fixed sensor configuration. By using a principal component regression (PCR) method, those spectral features are clustered around a set of points, along a unit circle in a 2-D label plane. From the training process, a regression vector locating a cluster is obtained, as well as the mean and covariance of a number of clusters. Then new data, of persons walking at random speeds, are used for testing the recognition capability.

Figure 2:
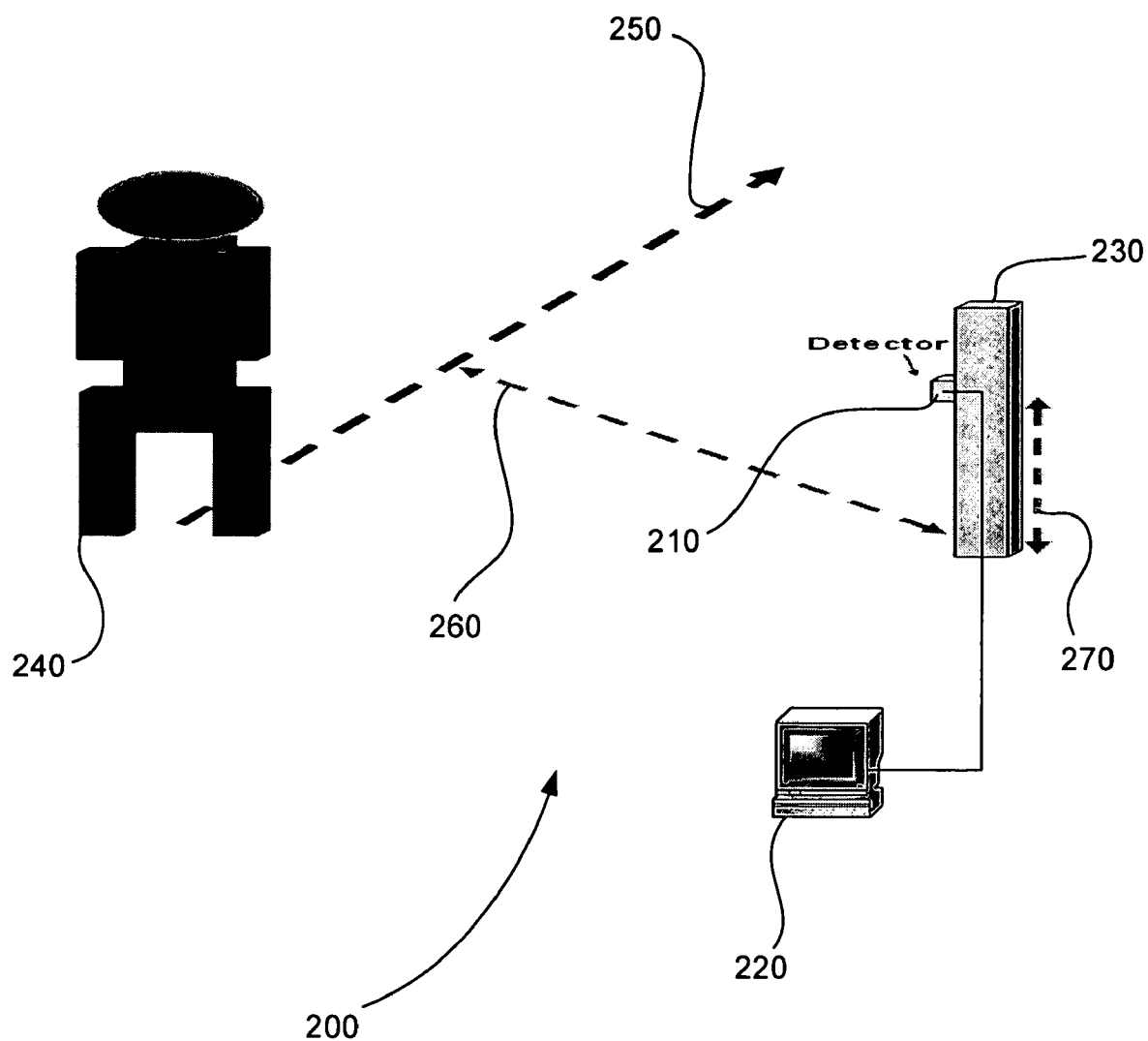
FIG. 2 is a schematic diagram of a sensor system for identifying and tracking movement of an object, in accordance with an embodiment of the present invention.

FIG. 2 is a schematic diagram of a sensor system 200 for identifying and tracking movement of a person 240, in accordance with an embodiment of the present invention. System 200 includes sensor 210 and processor 220. Sensor 210 can include but is not limited to one or more lenses, coded apertures, programmable amplifiers, and radiation detectors. Sensor 210 is mounted on pillar 230 at height 270. Sensor 210 detects radiation from person 240 as person 240 moves past sensor 210 along path 250. Distance 260 is the perpendicular distance between pillar 230 and path 250. Processor 220 is coupled to sensor 210.

According to another embodiment of the present invention, data from sensor 210 is collected into a packet and transmitted by an attached half-duplex wireless transmitter, a TRF6901 for example, to a similarly constructed collection node, where it undergoes additional signal processing and is relayed by a serial interface to processor 220 for analysis and display. A standard communication protocol is used in the transmission of data between each of the nodes and the master node along with error correction mechanisms for each transmitted byte. The wireless transmitters preferably operate at 20 Kkps (kilobits per second) and can be programmed to use variable frequencies. Making each node use its own frequency and performing frequency hopping on the collection nodes minimizes the communication protocol requirements while maximizing data throughput.

Processor 220 is used to process the information from sensor 210 in order to identify and track person 240. Person 240 can also be but is not limited to a vehicle or an animal. Person 240 is an object that radiates energy, for example, heat. Processor 220 creates a heat signature of person 240 from the measurements of sensor 210 and discriminates between different objects by comparing their heat signatures.

Parameters that impact the identification performance of processor 220 include but are not limited to characteristics of a coded aperture, height 270, and distance 260.

PIR detectors are advantageous for use in sensor 210, because of their low cost and low power consumption. A PIR detector costs $2, for example. A PIR detector consumes 2 mW, for example. PIR detectors are available in single element or dual element versions. A single element detector responds to any temperature changes in the environment and therefore needs to be thermally compensated to remove sensitivity to ambient temperature. Dual element detectors have the inherent advantage that the output voltage is the difference between the voltages obtained from each of the elements of the detector, which subtracts out environmental effect.

Figure 3:
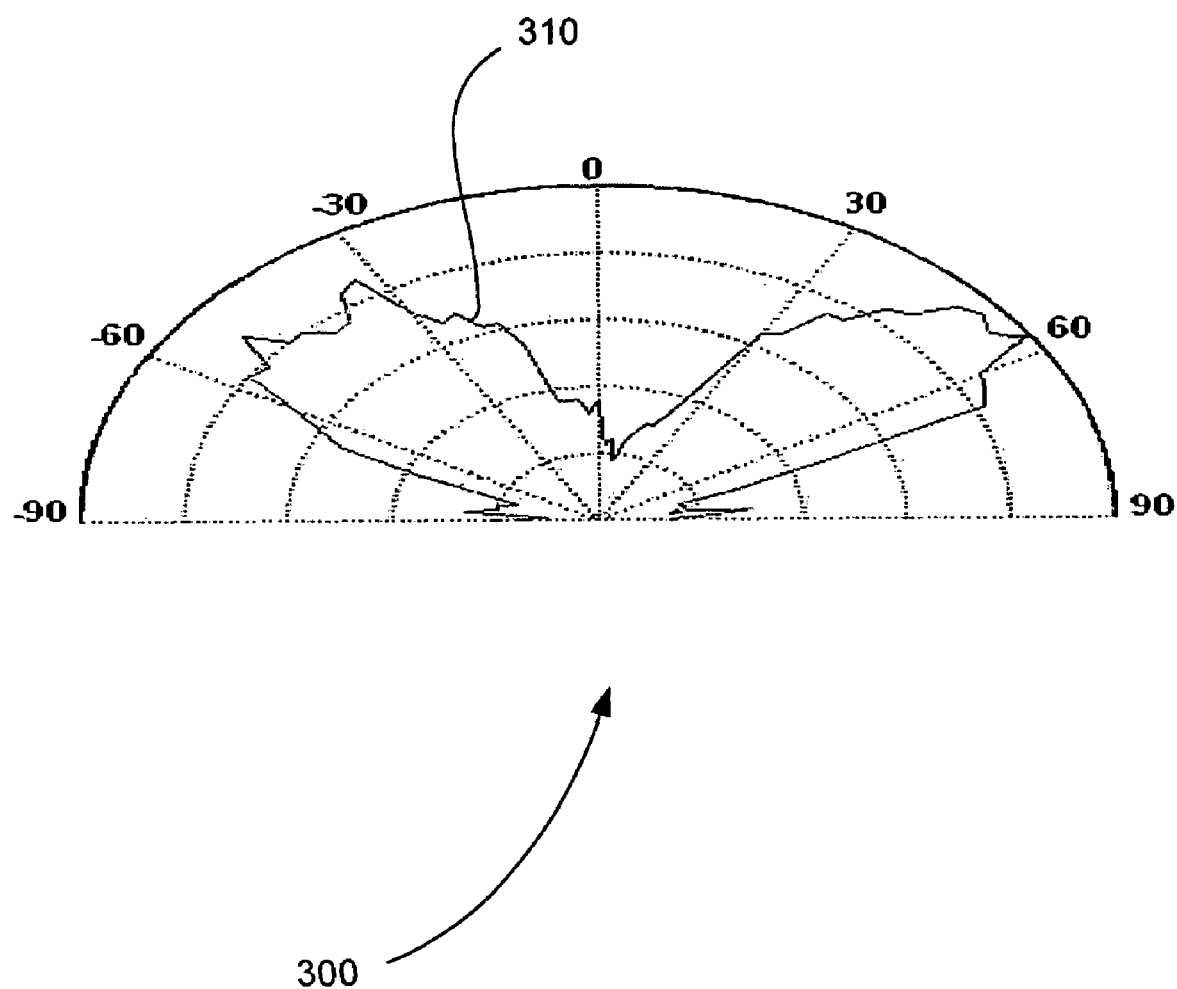
FIG. 3 is an exemplary polar plot of a dual element pyroelectric detector response, in accordance with an embodiment of the present invention.

FIG. 3 is an exemplary polar plot 300 of a dual element pyroelectric detector response 310, in accordance with an embodiment of the present invention. Response 310 is toward a point source, where the distance between the point source under testing and the sensor is normalized to show its generic visibility characteristic. A dual lobe visibility pattern is formed because the two pyroelectric elements are connected in series opposition. The signals obtained from each of the elements where a thermal source crosses the common area of overlap of the fields of view (FOVs) cancel one another.

An exemplary dual element pyroelectric detector is the PIR325 from Glolab Corporation. This detector can be used to detect IR radiation from human bodies.

Each element of the detector has an angular visibility of over 100 degrees, but any motion near both the margins of the FOV does not create a significant change in the thermal flux, resulting in very little response. The response of the detector depends on the incident power collected by the detector which in turn depends on the area of the detector. Since the detector elements have a small area (2 mm$^2$), the amount of power collected is a very small fraction of the incident power.

Pyroelectric detectors in themselves do not shed much light on the nature of the heat source they observe, because their resolution and collection efficiency are poor. Coded apertures are used as a visibility modulating element. The space is segmented and encoded based on the number of detectors and each spatial region is assigned a unique combination of overlapping detectors. A reference structure mask is then designed to modulate the visibility of the sensors to implement this code. A problem with coded apertures is that the signal to noise ratio (SNR) is poor, since much of the incident radiation is blocked by the mask.

According to another embodiment of the present invention, to improve both the collection efficiency and spatial resolution, Fresnel lens arrays are used to create a discontinuous visibility pattern. These sensors, therefore, trigger as heat sources cross the boundaries created by the visibility pattern. The nature of a lens array allows the visibility space to be segmented into multiple boundaries.

Fresnel lenses are very good energy collectors, and have been used extensively in non-imaging applications. They are especially useful for IR applications because of low fabrication costs and good transmission characteristics in the infrared.

Figure 4:
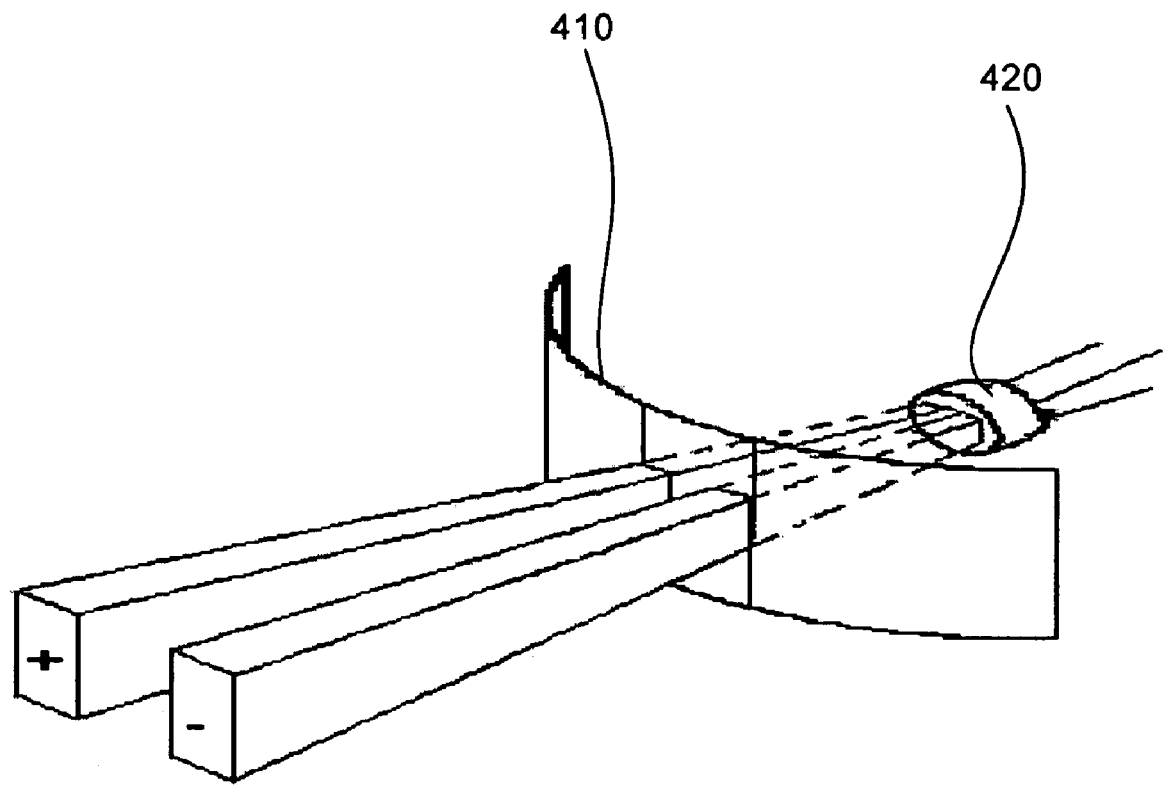
FIG. 4 is schematic diagram of a pyroelectric sensor, in accordance with an embodiment of the present invention.

FIG. 4 is schematic diagram of a pyroelectric sensor 400, in accordance with an embodiment of the present invention. Pyroelectric sensor 400 includes lens aperture 410 and dual element pyroelectric detector 420. Lens aperture 410 is used to improve both the collection efficiency and spatial resolution of dual element pyroelectric detector 420. Lens aperture 410 can be but is not limited to a Fresnel lens. A Fresnel lens can be molded out of inexpensive plastics with desired transmission characteristics (for the required wavelength range) making pyroelectric sensor 400 thin, light weight, and inexpensive.

In order to aid in motion sensing, Fresnel lens arrays are designed so that the visible space is divided into zones. Detection is enhanced by creating distinct regions of visibility. Each of the lenses on the array would typically create a single cone of visibility depending on the focal length and the size of the detector elements. However, with dual element pyroelectric detector 420, the cone of visibility of a lens is divided into two distinct zones, as illustrated in FIG. 4.

Figure 5:
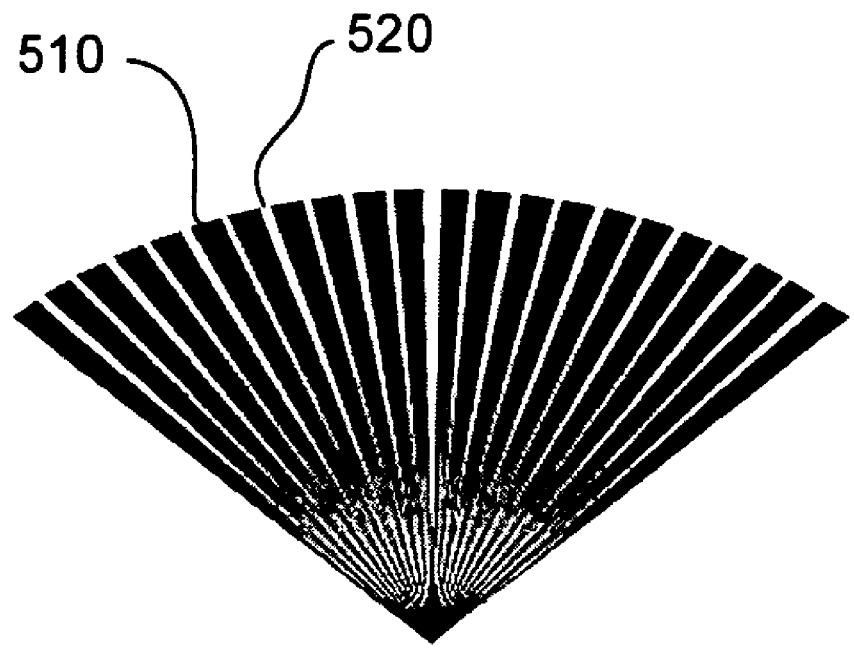
FIG. 5 is an exemplary top view of a field of view of a Fresnel lens array, in accordance with an embodiment of the present invention.
Figure 5:
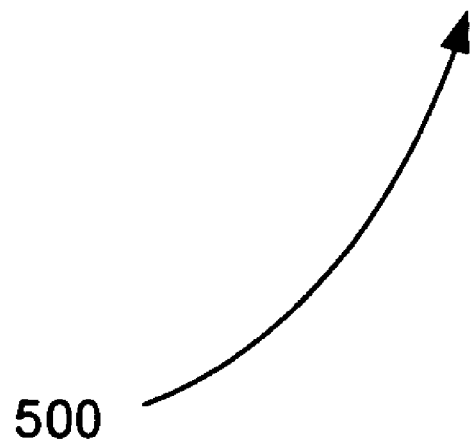

FIG. 5 is an exemplary top view 500 of a field of view of a Fresnel lens array, in accordance with an embodiment of the present invention. Each lens on the array produces two beams having an angular visibility. Visibility angle 510 is 3 degrees, for example, separated by angle 520, which is 1 degree, for example.

Figure 6:
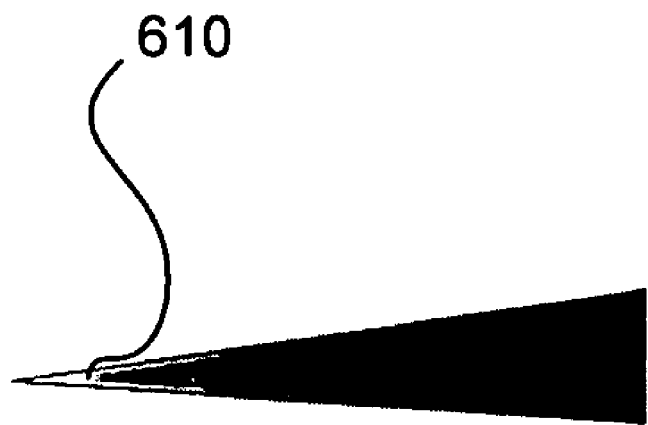
FIG. 6 is an exemplary side view of a field of view of a Fresnel lens array, in accordance with an embodiment of the present invention.
Figure 6:
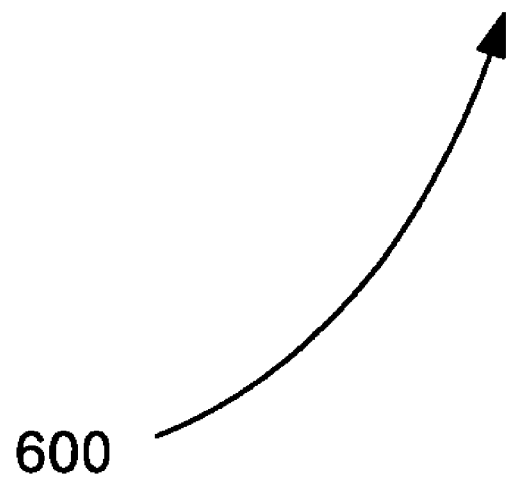

FIG. 6 is an exemplary side view 600 of a field of view of a Fresnel lens array, in accordance with an embodiment of the present invention. Visibility angle 610 is 12 degrees, for example. An exemplary Fresnel lens array is the "Animal alley array-AA0.9GIT1" from Fresnel Technologies, Inc. The material of this lens has suitable transmission in the 8-14 µm range. A summary of the different parameters of this lens array is shown in Table 1 below.

TABLE 1

| Parameter | Value |
| --- | --- |
| Angular coverage of each lens | 7° |
| Angular gap between adjacent beams | 2° |
| Angular gap between two beams from each lens | 1° |
| Lateral angular spread | 12° |
| Transmittance of lens in IR | 75% |

Figure 7:
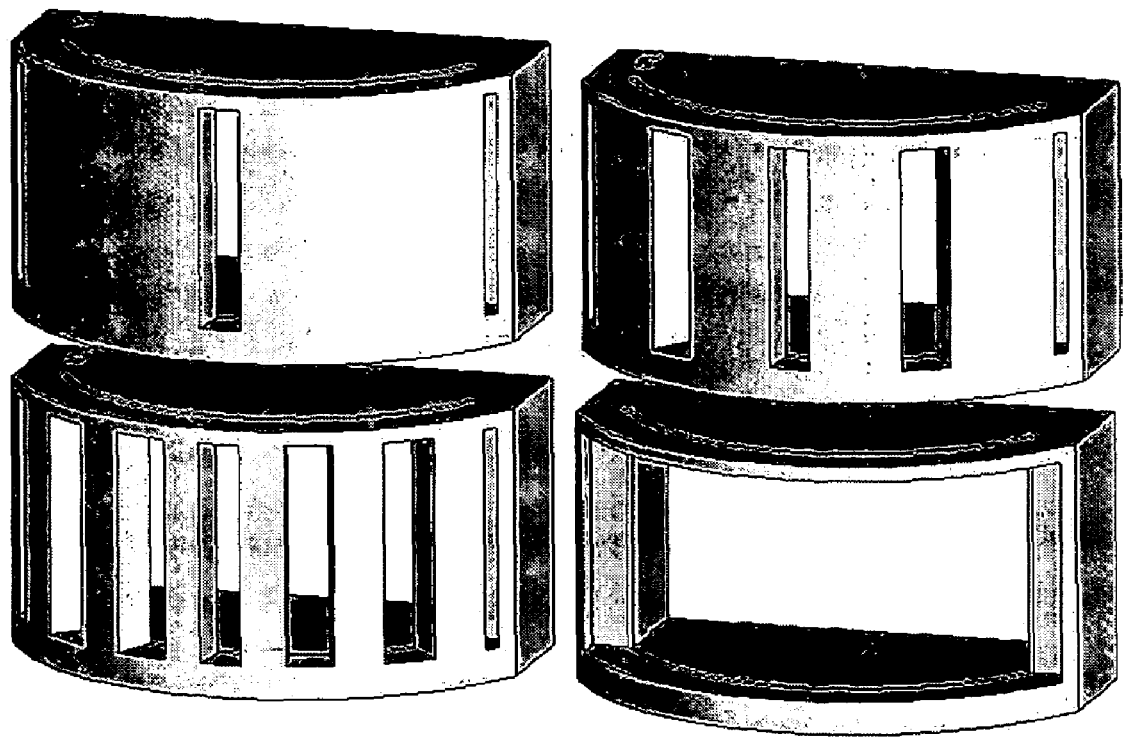
FIG. 7 is a schematic diagram of four plastic masks for Fresnel lens arrays containing one, three, five, and seven elements, in accordance with an embodiment of the present invention.

FIG. 7 is a schematic diagram of four plastic masks 700 for Fresnel lens arrays containing one, three, five, and seven elements or visibility zones, in accordance with an embodiment of the present invention. Fresnel lens arrays are available with a number different elements. For example, Fresnel lens arrays are available with 1, 3, 5, 7, 9, and 11 elements.

A wide variety of tracking methodologies such as Bayesian statistics can be applied to the tracking problem and within the particular statistics used, a number of strategies such as Kalman, Gaussian particle filters, and Hidden Markov Model. Tracking methodologies are further described in Appendix 1. The tracking methodology selected is driven by the amount of on-board processing power available. The Fresnel lens can shape the visibilities of pyroelectric sensors to detection regions with different visibility patterns and when humans enter different regions, different sets of sensors can fire simultaneously, and from those signal patterns the locations of people can be obtained.

Humans move in generally the same way, but with subtleties that can be recognized by those who are familiar with them, even at a distance. The multiplex nature of pyroelectric sensors allow capture of relatively small amounts of data that still bear the unique aspects of a person's movement. Because the pyroelectric sensors collectively project a set of boundary planes that cut through the intervening space, the subtle aspects of a person's gait will directly affect the sensors measurement.

Discrimination between members of a group are made by collecting data generated by the pyroelectric system such as the spectral content of the sensor's temporal signal, generated by humans walking along a path. During a training phase, features are collected and used to discriminate between registered humans while rejecting unregistered humans.

Figure 8:
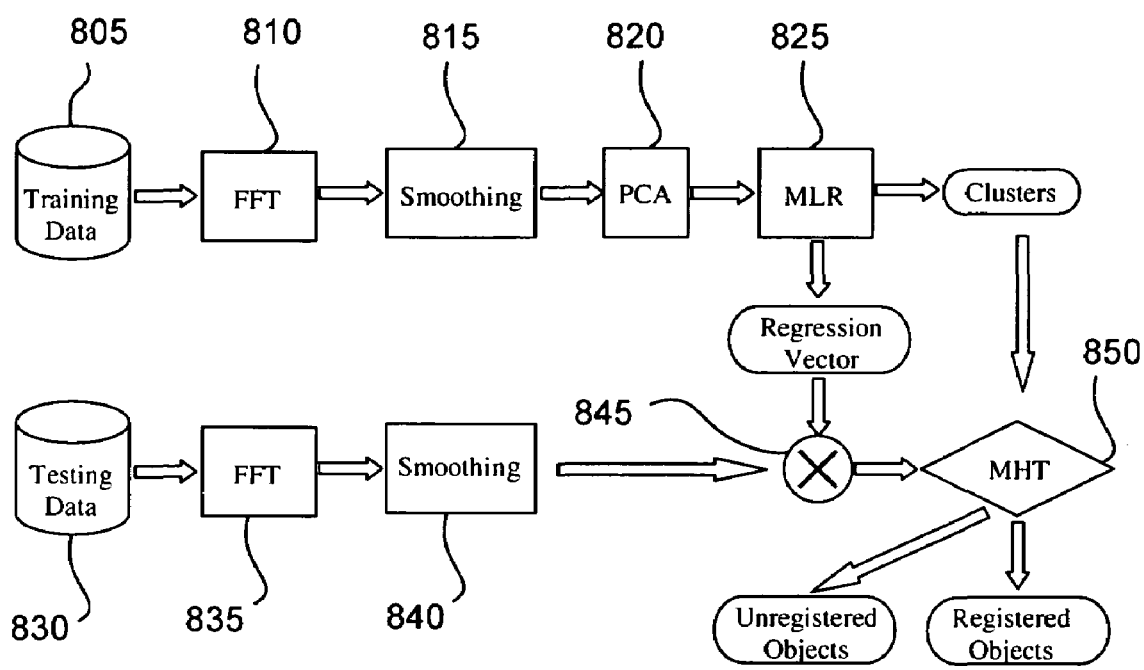
FIG. 8 is a flowchart of an identification method of a sensor system for identifying and tracking movement of an object, in accordance with an embodiment of the present invention.

FIG. 8 is a flowchart of an identification method 800 of a sensor system for identifying and tracking movement of an object, in accordance with an embodiment of the present invention. System 800 includes both training and testing paths.

In step 805 of method 800, temporal data of an object moving along a first path is obtained from a pyroelectric sensor. This is temporal training data.

In step 810, temporal training data is converted to a spectral radiation signature. A fast fourier transform (FFT) is used to create a Fourier spectra, for example. The result is spectral training data.

In step 815, a smoothing function is applied to the spectral training data to reduce noise present in the signal.

In step 820, principal components analysis is applied to the spectral training data. The results are the underlying factors and their scores for the spectral training data. Principal components analysis identifies significant spectral components from the Fourier spectra of the training data. A significant spectral component for a person walking can be but is not limited to the swinging of an arm or leg, the bobbing of the head, or the velocity of the person's body. These spectral components are the underlying factors and scores provided by principal components analysis. Discrete values for the underlying factors and scores are obtained by sampling the spectral components, for example. A matrix of discrete values for the underlying factors and score is produced from multiple data sets of training data from the same object.

In step 825, multiple linear regression is applied to the underlying factors and their scores to regress those scores. The result is a regression vector for training data and a mean and covariance of clustered training data. Multiple linear regression is used to reduce multiple lists (e.g., a matrix) of spectral components obtained from multiple samples of training data to a single list (e.g., a vector) of spectral components that uniquely identify the movement of the object. Multiple linear regression also provides a mean and covariance for each spectral component from the multiple lists or data sets.

In step 830, temporal data of an object moving along a second path is obtained from a pyroelectric sensor. This is temporal testing data.

In step 835, temporal testing data is converted to spectral radiation signature. A Fast Fourier transform is used to create a Fourier spectra, for example. The result is spectral testing data.

In step 840, a smoothing function is applied to the spectral testing data to reduce noise present in the signal.

In step 845, the inner product of the regression vector and the spectral testing data is obtained. The result is an estimate of the identity of a spectrum of the testing data. Like the training data, the spectral testing data also consists of more than one data set in order to reduce the effects of noise. As a result, there are multiple spectrums for the testing data. These multiple spectrums are represented in discrete form, for example, by a matrix. The inner product of this matrix and the regression vector is then used to produce an identity vector.

In step 850, the estimated identity of the spectrum of the testing data is checked against the clustered data of the training process and identified and unidentified objects are found. These identified and unidentified objects are also called registered and unregistered objects, respectively. An identified or registered object is one whose estimated identity of the spectrum is within a certain threshold of an object previously detected in the training phase. The threshold is selected by analyzing large sets of data. The threshold determines the accuracy of the system.

The first path of step 805 is, for example, a fixed or known path and the second path of step 830 is an unknown path. In another embodiment of the present invention, a senor array, or multiple sensor nodes, and additional feature representations are employed to improve the robustness of the system. With more advanced signal processing and feature extraction techniques, for example, the first path of step 805 does not need to be fixed or known. The result is a path-independent human recognition system, which is also less sensitive to the walking speed of objects.

Mathematically, PCR is used to find a regression vector F, such that the identity of a spectrum of unknown sensory data can be estimated, by an inner product of vector F and the spectrum S.

$$I = S \cdot F. \quad (1)$$

PCR uses the full spectrum, and is factor-based. The spectral information is not directly used in training, but is subject to factor analysis to find those factors that have the largest influence on data variations. PCR is divided into two steps: principal components analysis (PCA) followed by standard multiple linear regression (MLR). In multiple hypothesis testing (MHT), the identity of an unknown spectrum is estimated by Eq. (1) and then is checked against clusters and their distributions obtained from the training process.

PCA is a spectral decomposition of the spectrum matrix S, retaining only those factors that have large singular values. The remaining factors associated with small singular values are assumed to be from noise, and therefore omitted from the later regression phase. The singular value decomposition (SVD) of a spectral matrix S can be represented by the following equation.

$$S_{m \times n} = U_{m \times m} \Sigma_{m \times n} V_{n \times n}^T, \quad (2)$$

U and V are orthogonal matrices, m is the number of sample, n is the number of spectral points in one spectrum of the sensor's temporal signal.

$$\Sigma = \begin{bmatrix} \sigma_1 & & & & & & \\ & \sigma_1 & & & & & \\ & & \ldots & & & & \\ & & & \sigma_1 & & & \\ & & & & 0 & & \\ & & & & & \ldots & \\ & & & & & & \ldots \\ & & & & & & 0 \end{bmatrix}. \quad (3)$$

$\Sigma$ is diagonal with nonnegative singular values in descending order. Thus the spectrum matrix S can also be written as, $$S = \sum_{i=1}^{r} \sigma_i u_i v_i^T = \sigma_1 u_1 v_1^T + \sigma_2 u_2 v_2^T + \ldots + \sigma_r u_r v_r^T. \quad (4)$$

can be approximated by its first k singular values, assuming singular values for larger k are negligible.

$$S \approx S_k = \sum_{i=1}^{r} \sigma_i u_i v_i^T \quad (5)$$

$$= \sigma_1 u_1 v_1^T + \sigma_2 u_2 v_2^T + \ldots + \sigma_r u_r v_r^T$$

$$= \tilde{U}_{m \times k} \tilde{\Sigma}_{k \times k} \tilde{V}_{k \times n},$$

where k<<m,n.

The spectrum matrix S also can be defined as $$S \approx TP^T, \quad (6)$$

where $$T_{m \times k} = \tilde{U}_{m \times k} \tilde{\Sigma}_{k \times k},$$

$$P = V_{k \times n},$$

$$SP = T.$$

T is the score matrix, and P is the factor matrix. Geometrically, P is viewed as a new set of orthogonal coordinates spanning the inherent (true) dimensionality of the spectrum data matrix S, and T is the projection (scores) of S onto new coordinate system. It is called k-space.

Once underlying factors and their corresponding scores are obtained, MLR is performed to regress those scores. In the classification process, the Fourier spectrum is first projected onto those factors obtained during training, and the resulting scores are correlated with the calibration vector obtained by MLR in k-space. The spectrum vector is regressed against the score matrix $T_{m \times k}$, to get the regression vector $f_{k \times 1}$ in k-space. For example, the least-squares solution of the following equation is found.

$$I_{m \times 1} = T_{m \times k} f_{k \times 1}. \quad (7)$$

The least-squares solution for $f_{k \times 1}$ is $$f_{k \times 1} = (T^T T)^{-1} T^T I = \tilde{\Sigma}^{-2} T^T I, \quad (8)$$

where $$\tilde{\Sigma}^{-2} = \begin{bmatrix} \frac{1}{\sigma_1^2} & & & \\ & \frac{1}{\sigma_2^2} & & \\ & & \ldots & \\ & & & \frac{1}{\sigma_k^2} \end{bmatrix}. \quad (9)$$

Finally, from Eq. (6), Eq. (7), and Eq. (8) the regression vector can be written as follows.

$$F_{n \times 1} = P_{n \times k} f_{k \times 1} \quad (10)$$

$$= P_{n \times k} (\tilde{\Sigma})^{-2} (T)^T I$$

$$= \tilde{V}_{n \times k} (\tilde{\Sigma})^{-2} (\tilde{U}_{m \times k} \tilde{\Sigma}_{k \times k})^T I$$

$$= \tilde{V}_{n \times k} (\tilde{\Sigma})^{-2} (\tilde{U}_{m \times k})^T I$$

From multiple linear regression, the resultant regression vector is obtained, as well as mean and covariance of clustered training data, $[\mu_1, \ldots, \mu_K]$ and $[\Sigma_1, \ldots, \Sigma_K]$, where K is the number of clusters. Therefore, for an unlabeled spectrum x, there are K+1 hypothesis, $\{H_0, H_1, \ldots, H_K\}$, to test. The hypothesis $H_0$ represents "none." The decision rule then is $$x \in \begin{cases} H_0, & \text{if } \max_i \{p(x|H_i)\} < \gamma \\ H_i: i = \operatorname{argmax}_i \{p(x|H_i)\}, & \text{otherwise} \end{cases} \quad (11)$$

where $p(x|H_i) = N(x|\mu_i, \Sigma_i)$ is the association of x with the $i^{th}$ cluster and $\gamma$ is a selected rejection threshold. Recognition ability of the process is measured by the false alarm rate, which can be defined by the following equation.

$$FAR = \frac{\# \text{ of false sets}}{\# \text{ of testing sets}}$$

According to another embodiment of the present invention, experimental data is collected using pyroelectric system 200 of FIG. 2. Sensor 210 includes a PIR detector and a Fresnel lens array. Sensory data is collected when difference people walk back and forth along a prescribed straight path 250, where distance 260 is between two and three meters. Height 270 is approximately 80 centimeters. Data is collected as a human 240 moves along path 250.

In response to heat flow, electric charge is built up on a pyroelectric detector of sensor 210 by virtue of its pyroelectric property. The electric charge results in an electric current which is converted to a voltage signal by a current to voltage amplifier (e.g., a transductance amplifier).

Figure 9:
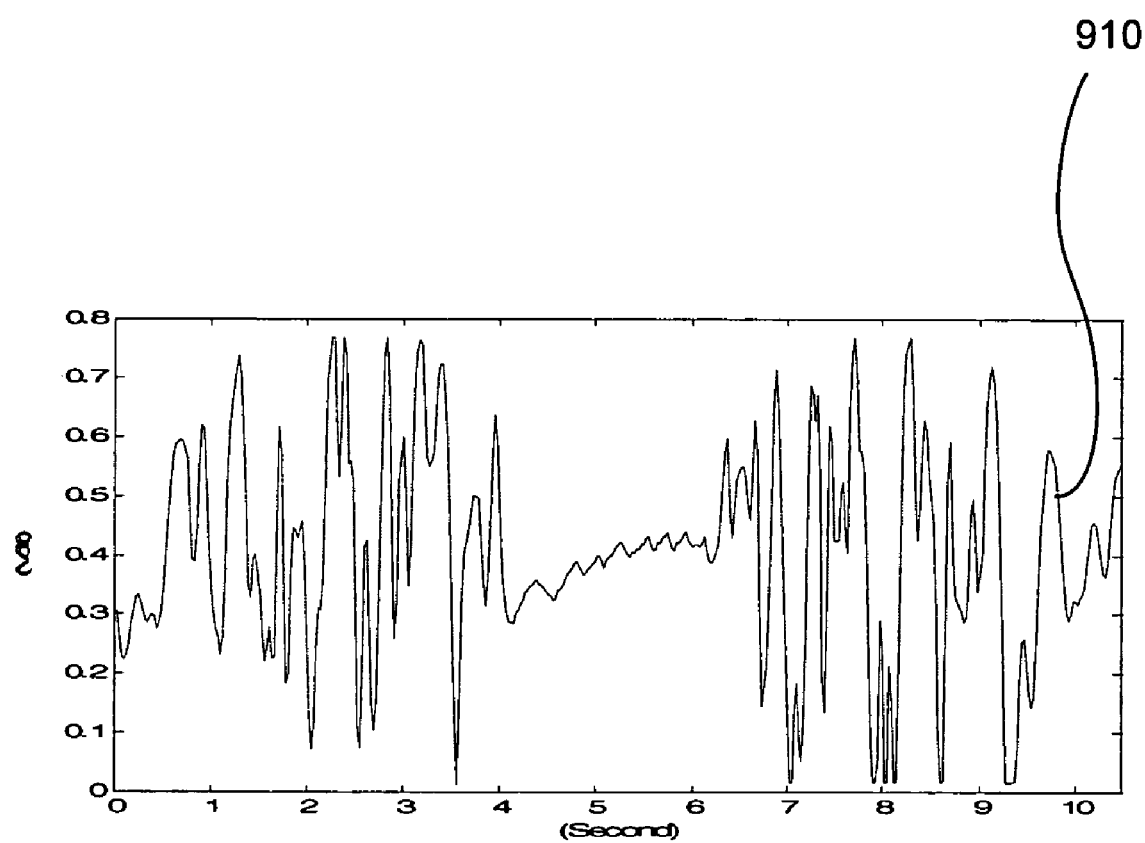
FIG. 9 is an exemplary plot of temporal voltage signals generated by a human walking across the field of view of a pyroelectric sensor, in accordance with an embodiment of the present invention.

FIG. 9 is an exemplary plot 900 of a temporal voltage signal 910 generated by a human walking across the field of view of a pyroelectric sensor, in accordance with an embodiment of the present invention.

Figure 10:
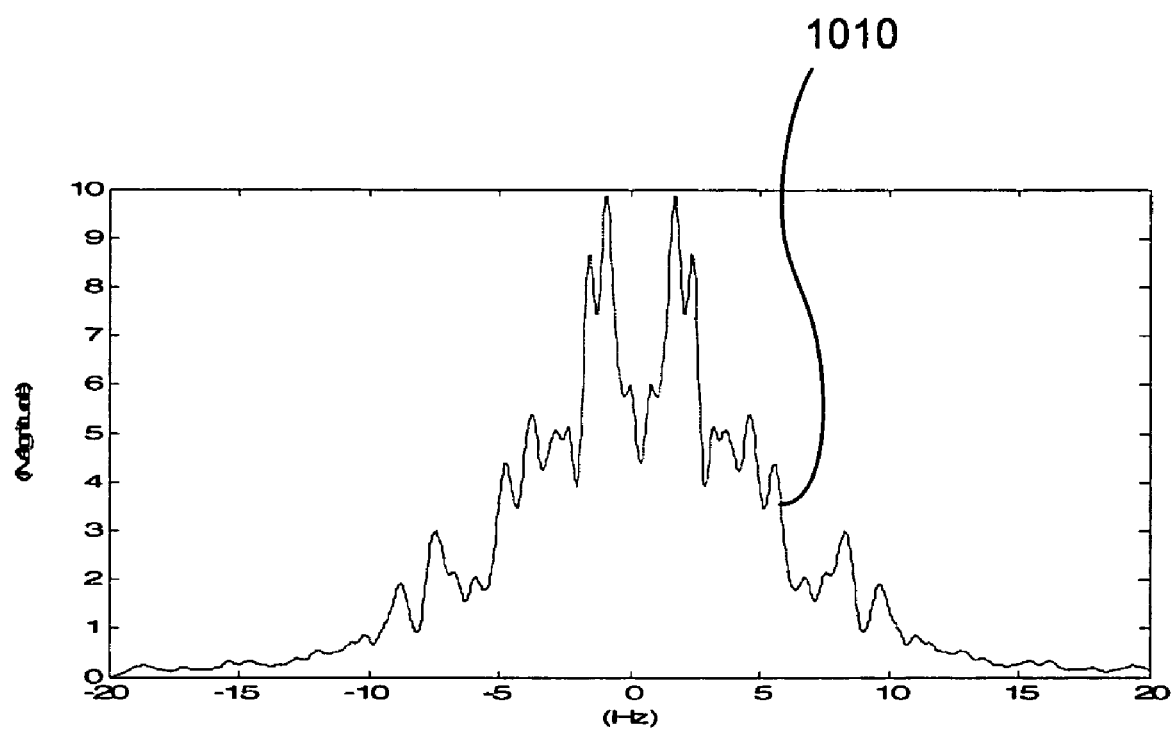
FIG. 10 is an exemplary plot of a spectra corresponding to voltage signals generated by a human walking across the field of view of a pyroelectric sensor, in accordance with an embodiment of the present invention.
Figure 10:
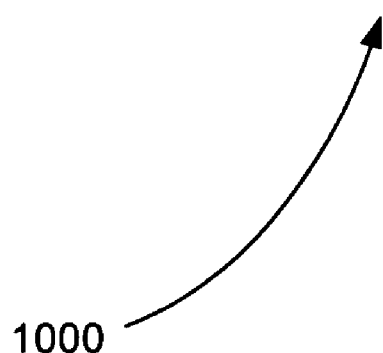

FIG. 10 is an exemplary plot 1000 of a spectra 1010 corresponding to voltage signals generated by a human walking across the field of view of a pyroelectric sensor, in accordance with an embodiment of the present invention.

The Fourier spectra generated by two people walking at a similar speed are generally different. Also, for the same person, different speeds produce spectral differences. Hence, in addition, the effects of speed are taken into account in building a functional identification system.

According to another embodiment of the present invention, an optimal number of elements of a Fresnel lens array is found by modulating the visibility of pyroelectric sensors by Fresnel lens arrays with 1, 3, 5, and 11 transparent elements. Exemplary masks used for selection of different lens elements are shown in FIG. 7.

According to another embodiment of the present invention, the effects of the sensor location and sensor-target distance upon the identification performance are studied. The sensor unit is located at the heights of 35 cm, 80 cm, and 120 cm respectively and two fixed-paths, 2 m and 3 m, from the sensor are used. For each sensor-object configuration, 60 sets of data are collected for each person walking back and forth along a fixed-path at 3 different speed levels, namely fast, moderate, and slow, all within the range of the daily walking habit. The Fourier spectra of measured signals of the two human objects are collected. Data collected at the different walking speeds is displayed in columns. Data obtained with the different element numbers of Fresnel lens arrays is displayed in rows. Each plot contains 20 superimposed data sets which are gathered from 20 independent walks. By reviewing such displays it is seen that there is a degree of spectra overlap and that the repeatability of the spectral features is high.

According to another embodiment of the present invention, an identification procedure consists of two parts: training and testing. During training, 120 data sets are clustered from each sensor-lens pair into 6 clusters, two persons, and three speeds. Since the label of each data set is known, the clustering process is viewed as supervised training. As such, these 6 clusters are mapped to 6 points equally distributed along a circle using linear regression. The resultant regression vector obtained from PCR defines the linear boundary between the data sets.

Figure 11:
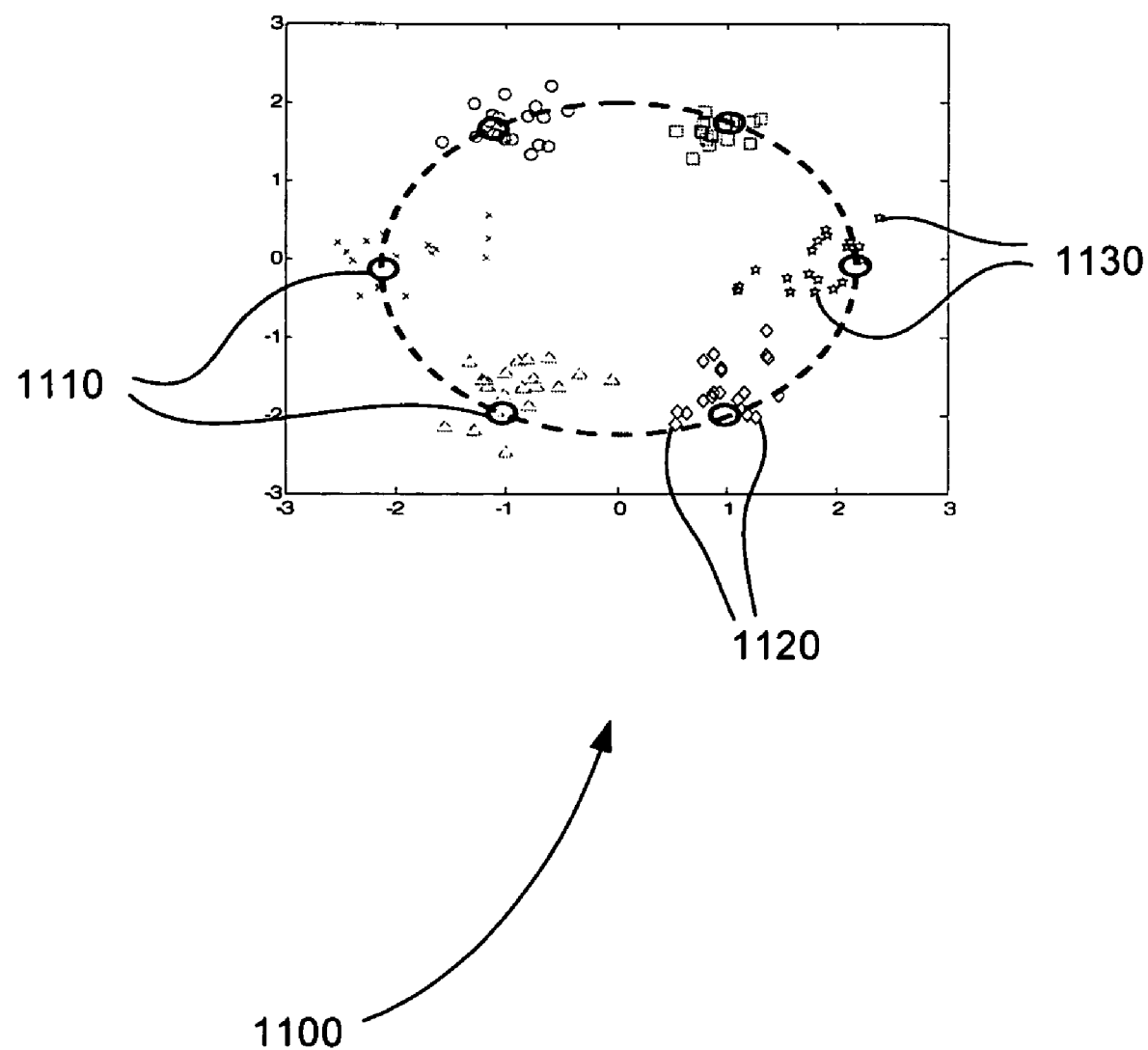
FIG. 11 is an exemplary plot of supervised clustering results upon six labels for 120 data sets collected from a pyroelectric sensor including an eleven-element Fresnel lens array, in accordance with an embodiment of the present invention.

FIG. 11 is an exemplary plot 1100 of supervised clustering results upon six labels for 120 data sets collected from a pyroelectric sensor including an eleven-element Fresnel lens array, in accordance with an embodiment of the present invention. The six circles 1110 represent the locations of clustered results for two different people walking at three different speeds. Each circle 1110 is then surrounded by 20 data points that represent 20 separate walks by a particular person at a particular speed. The data points are placed on plot 1100, for example, based on the relative locations of two spectral components. Diamonds 1120 are, for example, 20 walks by Jason at slow speed, while stars 1130 are 20 walks by Bob at a fast speed. FIG. 11 shows that both different people and the speed of movement of the same person can be distinguished by an embodiment of the present invention.

Clustering results are obtained for the sensor units with 1, 5, and 11-element Fresnel lens arrays. The results show that the use of an increased number of lens elements in the lens array yield better performance in the supervised classification.

Figure 12:
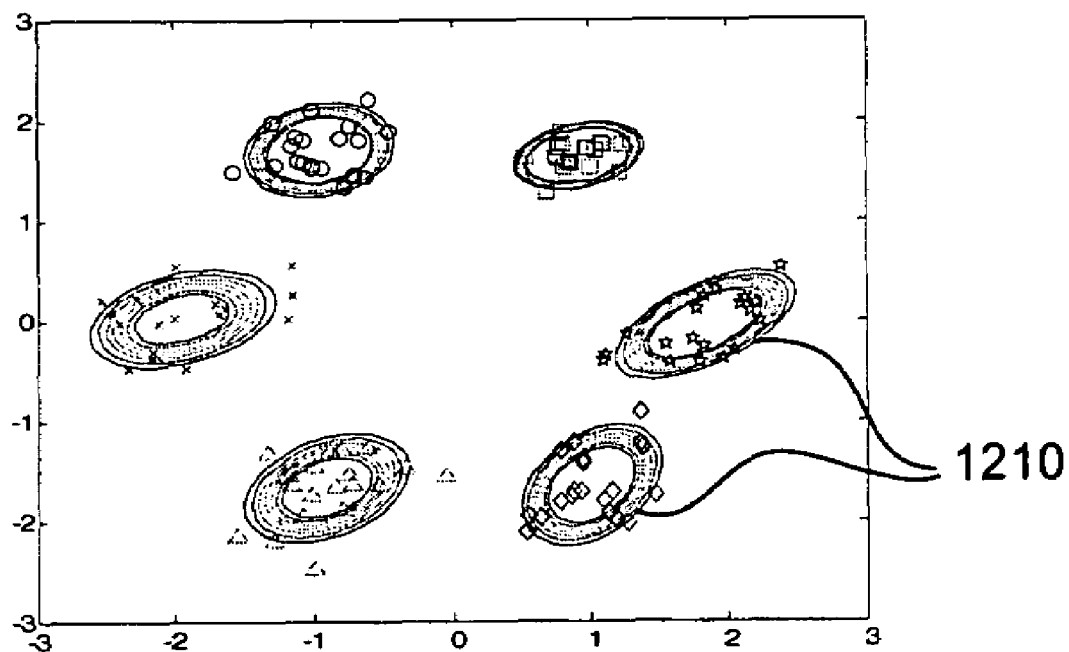
FIG. 12 is an exemplary plot of probability density distribution of the clusters shown in FIG. 11, in accordance with an embodiment of the present invention.
Figure 12:
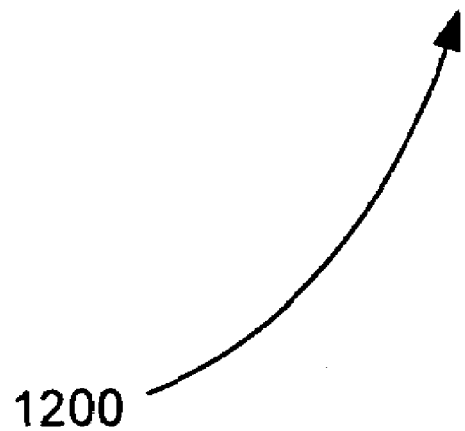

FIG. 12 is an exemplary plot 1200 of probability density distributions of the clusters shown in FIG. 11, in accordance with an embodiment of the present invention. FIG. 12 shows the contours 1210 of probability density distributions (pdfs) associated with the clusters in FIG. 11. Contours 1210 of probability density ranging from 0.1 to 0.7 are drawn in FIG. 12 to aid in interpretation. These contours are used to specify a threshold that determines whether or not an object has been identified.

According to another embodiment of the present invention, after determining the optimal number of lens element, the effects of sensor locations are studied. Clustering results and their pdfs are obtained for the sensor unit with an 11-element lens array placed at the heights of 120 cm and 35 cm, respectively.

According to another embodiment of the present invention, MHT is carried out for human identification. 20 data sets are collected for each person walking at random speeds. For two registered persons, there are 40 data sets for each configuration of sensor units. A probability density of each data set is calculated to determine its cluster membership. The threshold for membership is chosen to be 0.05. If the probability density value of a data set is below the threshold, the data set is labeled as others.

Figure 13:
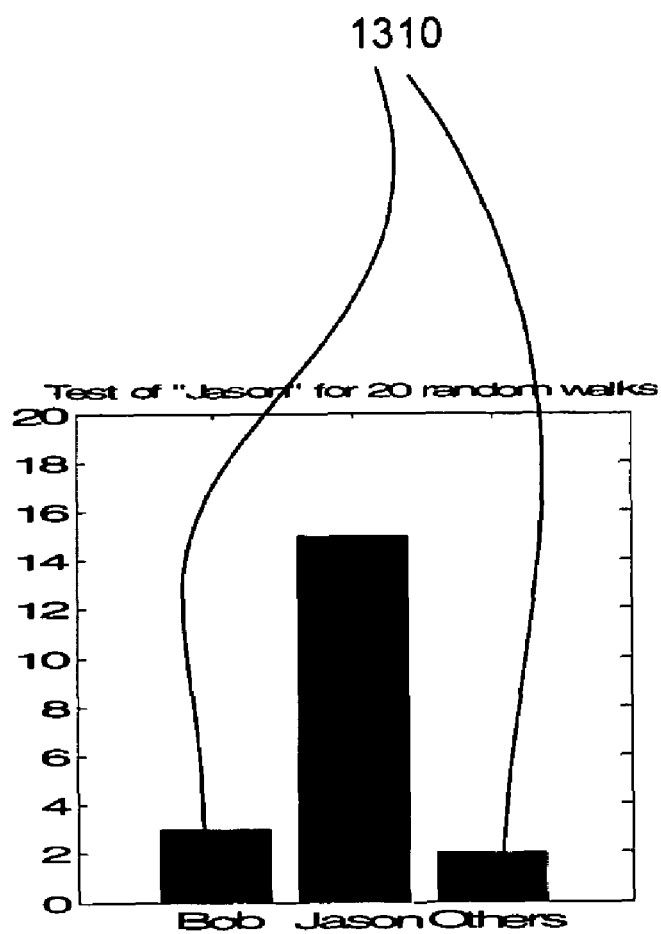
FIG. 13 is an exemplary plot of identification results for a sensor unit with an eleven-element lens array at a sensor object distance of two meters and a sensor unit placed at a height of 80 centimeters, in accordance with an embodiment of the present invention.
Figure 13:
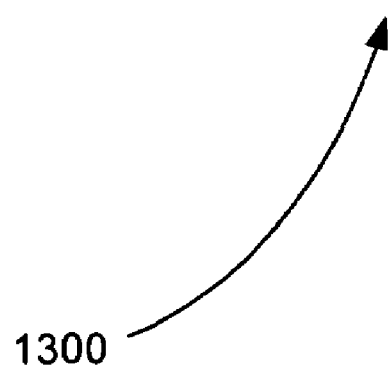

FIG. 13 is an exemplary plot 1300 of identification results for a sensor unit with an eleven-element lens array at the a sensor object distance of two meters and a sensor unit placed at a height of 80 centimeters, in accordance with an embodiment of the present invention. False data sets 1310 are, for example, used to calculate a false alarm rate.

Results similar to FIG. 13 are obtained for the sensor unit with an eleven-element Fresnel lens array at a total of three different heights and at a total of two different distances from the object using four different Fresnel lens arrays. Data is generated for two objects: Bob and Jason.

The false alarm rates for different sensor configurations and for a single person are summarized below in Table 2. For example, the false alarm rate for Bob walking along a path 3 m (L) from a pillar on which an eleven-element (N) sensor is mounted 80 cm (H) above the ground is 2.5%. In other words, a system as shown in FIG. 2, where the path is 3 m from the pillar and the sensor includes an eleven-element sensor mounted 80 cm above the ground can identify Bob from other people 97.5% the time. The false alarm rate was defined earlier. It can be seen that the sensor unit with an 11-element lens array located at the height of 80 cm displays the best performance.

TABLE 2

| | H | | | | | |
|---|---|---|---|---|---|---|
| | 35 cm | | 80 cm | | 120 cm | |
| | L | | | | | |
| N | 2 m | 3 m | 2 m | 3 m | 2 m | 3 m |
| 1 | 17.5% | 17.5% | 20% | 12.5% | 45% | 17.5% |
| 3 | 20% | 12.5% | 20% | 7.5% | 32.5% | 17.5% |
| 5 | 17.5% | 12.5% | 17.5% | 5% | 35% | 10% |
| 11 | 17.5% | 10% | 15% | 2.5% | 15% | 7.5% |

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

Systems and methods in accordance with an embodiment of the present invention disclosed herein can advantageously increasing the scalability and decrease the cost of tracking and identifying humans moving within a fixed space.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for identifying an object from movement of the object, comprising:
    a sensor comprising a coded aperture for detecting radiation from the object as the object moves over time; and
    a processor coupled to the sensor, for converting the detected radiation to a spectral radiation signature, and for comparing the spectral radiation signature to at least a second spectral radiation signature to identify the object.

2. A system for identifying an object from movement of the object, comprising:
    a sensor comprising a Fresnel lens array for detecting radiation from the object as the object moves over time, wherein the Fresnel lens array comprises a mask and wherein the mask comprises at least one zone of visibility; and
    a processor coupled to the sensor, for converting the detected radiation to a spectral radiation signature, and for comparing the spectral radiation signature to at least a second spectral radiation signature to identify the object.

3. A system for identifying an object from movement of the object, comprising:
    a sensor for detecting radiation from the object as the object moves along a first path over time; and
    a processor coupled to the sensor, wherein the processor converts the detected radiation to a spectral radiation signature; and
    wherein the processor is adapted:
        to obtain temporal radiation data from a second object moving along a second path using the sensor;

to convert the temporal radiation data from the second object to a second spectral radiation signature;
to apply principal components analysis to the second spectral radiation signature to produce underlying factors and scores for the second spectral radiation signature;
to apply a multiple linear regression to the underlying factors and scores to produce a regression vector and a mean and covariance of clustered data for the second spectral radiation signature;
to obtain an inner product of the regression vector and the spectral radiation signature; and
to compare the inner product to the mean and covariance of clustered data to determine if an identity of the object matches the second object.

4. The system of claim 3 wherein the sensor comprises an infrared detector.

5. The system of claim 4 wherein the infrared detector comprises a pyroelectric detector.

6. The system of claim 5 wherein the pyroelectric detector comprises more than one detector element.

7. The system of claim 3 wherein the object is one of an animal, a vehicle, and a human being.

8. The system of claim 3 wherein the sensor comprises a coded aperture.

9. The system of claim 3 wherein the sensor comprises a lens.

10. The system of claim 3 wherein the sensor comprises a Fresnel lens array.

11. The system of claim 10 wherein the Fresnel lens array comprises a mask, wherein the mask comprises at least one zone of visibility.

12. The system of claim 3 wherein a second sensor is used to determine a location of the object.

13. A method for identifying an object from movement of the object, comprising:
obtaining first temporal radiation data from a first object moving along a first path;
converting the first temporal radiation data from the first object to a first spectral radiation signature;
applying principal components analysis to the first spectral radiation signature to produce underlying factors and scores for the first spectral radiation signature;
applying a multiple linear regression to the underlying factors and scores to produce a regression vector and a mean and covariance of clustered data for the first spectral radiation signature;
obtaining second temporal radiation data from a second object moving along a second path;
converting the second temporal radiation data from the second object to a second spectral radiation signature;
obtaining an inner product of the regression vector and the second spectral radiation signature; and
comparing the inner product to the mean and covariance of clustered data to determine if an identity of the first object matches the second object.

14. The method of claim 13 wherein the first object is one of an animal, a vehicle, and a human being.

15. The method of claim 13 wherein the second object is one of an animal, a vehicle, and a human being.

16. The method of claim 13 wherein obtaining first temporal radiation data and obtaining first temporal radiation data comprise using a sensor to detect radiation from the first object over time and using the sensor to detect radiation from the second object over time.

17. The method of claim 16 wherein the sensor comprises an infrared detector.

18. The method of claim 17 wherein the infrared detector comprises a pyroelectric detector.

19. The method of claim 18 wherein the pyroelectric detector comprises more than one detector element.

20. The method of claim 16 wherein the sensor comprises a coded aperture.

21. The method of claim 16 wherein the sensor comprises a lens.

22. The method of claim 16 wherein the sensor comprises a Fresnel lens array.

23. The method of claim 22 wherein the Fresnel lens array comprises a mask, wherein the mask comprises at least one zone of visibility.

24. A system for identifying a human being from movement of the human being, comprising:
a dual element pyroelectric detector, wherein the dual element pyroelectric detector detects radiation from the human being as the human being moves over time;
a Fresnel lens array, wherein the Fresnel lens array is located between the dual element pyroelectric detector and the human being, wherein the Fresnel lens array comprises a mask, and wherein the mask comprises at least one zone of visibility; and
a processor, wherein the processor is coupled to the dual element pyroeletric detector, the processor converts the detected radiation to a spectral radiation signature, and the processor compares the spectral radiation signature to at least a second spectral radiation signature to identify the human being.

25. A system for identifying a human being from movement of the human being, comprising:
a dual element pyroelectric detector, wherein the dual element pyroelectric detector detects radiation from the human being as the human being moves along a first path over time;
a Fresnel lens array, wherein the Fresnel lens array is located between the dual element pyroelectric detector and the human being, wherein the Fresnel lens array comprises a mask, and wherein the mask comprises at least one zone of visibility; and
a processor; wherein the processor is coupled to the dual element pyroelectric detector;
wherein the processor converts the detected radiation to a spectral radiation signature; and
wherein the processor is adapted:
to obtain temporal radiation data from a second human being moving along a second path using the sensor;
to convert the temporal radiation data from the second human being to a second spectral radiation signature;
to apply principal components analysis to the second spectral radiation signature to produce underlying factors and scores for the second spectral radiation signature;
to apply a multiple linear regression to the underlying factors and scores to produce a regression vector and a mean and covariance of clustered data for the second spectral radiation signature;
to obtain an inner product of the regression vector and the spectral radiation signature; and
to compare the inner product to the mean and covariance of clustered data to determine if an identity of the human being matches the second human being.

* * * * *